(12) United States Patent
Gagneur et al.

(10) Patent No.: US 10,498,145 B2
(45) Date of Patent: Dec. 3, 2019

(54) BALANCING OF A BATTERY HAVING TWO BRANCHES, WITH BRIDGING OF DIFFERENTIAL NUMBERS OF STORAGE ELEMENTS

(71) Applicant: RENAULT s.a.s., Boulogne-Billancourt (FR)

(72) Inventors: Laurent Gagneur, Montigny le Bretonneux (FR); Ana-Lucia Driemeyer-Franco, Montigny le Bretonneux (FR); Christophe Forgez, Compiegne (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 385 days.

(21) Appl. No.: 15/036,636

(22) PCT Filed: Nov. 14, 2014

(86) PCT No.: PCT/FR2014/052906
§ 371 (c)(1),
(2) Date: May 13, 2016

(87) PCT Pub. No.: WO2015/075358
PCT Pub. Date: May 28, 2015

(65) Prior Publication Data
US 2016/0285283 A1    Sep. 29, 2016

(30) Foreign Application Priority Data

Nov. 21, 2013   (FR) ...................... 13 61457

(51) Int. Cl.
*H02J 7/00*   (2006.01)

(52) U.S. Cl.
CPC ............ *H02J 7/0019* (2013.01); *H02J 7/007* (2013.01); *H02J 7/0014* (2013.01);
(Continued)

(58) Field of Classification Search
CPC ........ H02J 7/0019; H02J 7/007; H02J 7/0021; H02J 7/0014; H02J 7/0024; H02J 7/0016; Y02T 10/7055
(Continued)

(56) References Cited

U.S. PATENT DOCUMENTS

| 2001/0054877 | A1* | 12/2001 | Kinoshita | ............. H02J 7/0014 |
| | | | | 320/112 |
| 2009/0134851 | A1* | 5/2009 | Takeda | .................... H02M 3/07 |
| | | | | 323/234 |

(Continued)

FOREIGN PATENT DOCUMENTS

| DE | 10 2011 054 790 A1 | 4/2013 |
| JP | 2008-117573 A | 5/2008 |

OTHER PUBLICATIONS

English Machine Translation of JP2008117573.*
(Continued)

*Primary Examiner* — Nathaniel R Pelton
*Assistant Examiner* — Manuel Hernandez
(74) *Attorney, Agent, or Firm* — Oblon, McClelland, Maier & Neustadt, L.L.P.

(57) ABSTRACT

A method manages an electrical energy storage battery comprising first and second branches in parallel and each having N storage elements in series. The method includes providing a non-dissipative balancing device for balancing electrical voltages at terminals of the storage elements. The device includes N+1 switching elements of a first type to electrically connect, in parallel, two storage elements belonging to first and second branches at a same stage, and 2N switching elements of a second type to electrically connect, in parallel, two storage elements belonging to first and second branches at adjacent stages. The method also includes choosing only a portion of the storage elements of the first branch, choosing only a portion of the storage (Continued)

elements of the second branch, and controlling the switching elements so as to electrically connect to one another, in parallel, the selected storage elements of the first and second branches.

10 Claims, 4 Drawing Sheets

(52) U.S. Cl.
CPC .......... *H02J 7/0016* (2013.01); *H02J 7/0021* (2013.01); *H02J 7/0024* (2013.01); *Y02T 10/7055* (2013.01)

(58) Field of Classification Search
USPC .......................................... 320/117, 118, 126
See application file for complete search history.

(56) References Cited

U.S. PATENT DOCUMENTS

| | | | |
|---|---|---|---|
| 2011/0215760 A1* | 9/2011 | van Lammeren | H02J 7/0014 320/116 |
| 2012/0091964 A1* | 4/2012 | Vance | B60L 3/0046 320/122 |
| 2012/0286578 A1* | 11/2012 | Uno | H02J 7/0014 307/77 |
| 2014/0349146 A1 | 11/2014 | Dittmann | |

OTHER PUBLICATIONS

International Search Report dated Mar. 5, 2015 for PCT/FR2014/052906 filed on Nov. 14, 2014.
French Search Report dated Aug. 1, 2014 for FR 1361457 filed on Nov. 21, 2013.

* cited by examiner

BALANCING OF A BATTERY HAVING TWO BRANCHES, WITH BRIDGING OF DIFFERENTIAL NUMBERS OF STORAGE ELEMENTS

TECHNICAL FIELD OF THE INVENTION

The invention relates to the field of voltage balancing of the elements of an electrical energy storage battery having at least two parallel branches.

More precisely, the invention relates to a method and a device for managing an electrical energy storage battery comprising at least first and second branches electrically connected in parallel and each having N storage elements electrically connected in series.

PRIOR ART

The batteries used in electric vehicles, for example of the lithium-ion type, are formed by a set of storage elements, for example electrochemical cells, which are assembled in series in order to reach the voltage level required by the application. On the other hand, in order to reach a capacity level required by the application, a battery can comprise an assembly in parallel of the storage elements. This is why it is often the case that an electrical energy storage battery comprises a plurality of branches electrically connected to one another in an assembly in parallel and each comprising a plurality of storage elements electrically connected to one another in an assembly in series. The number of branches is dependent on the sought capacity. The number of elements connected in series along each branch is in turn dependent on the sought voltage.

The current manufacturing processes do not make it possible to obtain perfectly identical storage elements, in particular in terms of features such as their capacity and their internal resistance. In addition, these elements are exposed, over the course of the service life of the battery, to different temperature variations on account of their positioning in the battery, which causes said elements to age heterogeneously. When the same current is passed through these elements having different features, said elements become unbalanced, and in this sense their states of charge are different.

Battery management devices for correcting such imbalances are known in order to allow optimal use of the energy contained in the battery (the range of use being determined by the elements charged to a greater extent and those charged to a lesser extent). Balancing can be performed on the basis of information concerning the state of charge ("SOC") of the elements or on the basis of the voltage or no-load voltage of said elements.

The balancing methods currently used are active or passive:

passive (or dissipative) balancing discharges the storage elements charged to a greater extent in dissipative elements (resistors) so that said storage elements all have the same state of charge;

active (or non-dissipative) balancing transfers the energy of the elements charged to a greater extent to the elements discharged to a greater extent so as to converge toward a same state of charge.

Nowadays, the 'passive' balancing systems aim to dissipate the energy of cells charged to a greater extent in resistors, and therefore they do not restrict the charging of the set of elements of the battery: energy is thus lost. The use of this technique during discharging of the battery leads to a reduction of the voltage of the battery, which leads to an increase of the current necessary in order for the battery to deliver a given power and does not allow an increase in autonomy.

By contrast, 'active' balancing aims to distribute the energy of cells charged to a greater extent to cells charged to a lesser extent and makes it possible to gain autonomy. The active balancing circuits are relatively complex and generally use energy transfer means such as transformers. These energy transfer chains have non-unitary conversion yields.

The invention relates to the field of non-dissipative balancing.

A balancing solution is known from document EP1869748B1, which describes the principle of bridging the plurality of cells contained in each of the modules of the battery, then bridging all of the modules. This solution, however, is not very flexible because all of the modules and cells are balanced independently of the actual needs of each of the cells. An additional major disadvantage of this solution is that it can only be implemented when the battery is not being used, i.e. only when the battery is disconnected and is being neither charged nor discharged, this being due to the fact that connections and disconnections lead to sudden variations in the voltage at the terminals of the battery.

Document EP2363935A1 describes a switching structure in which each stage is provided with three switches. The balancing system connects in parallel, during a first period, a storage element of order n of one branch to a storage element of order n of another branch. The balancing system then connects in parallel, during a second period, a storage element of order n of the main branch to a storage element of order n−1 of the secondary branch. The balancing system then connects in parallel, during a third period, a storage element of order n of the main branch to a storage element of order n+1 of the secondary branch. Whatever the period, the bridging concerns only one stage of the main branch with respect to just one other of the secondary branch. The balancing currents are limited, which is not entirely satisfactory. On the other hand, with each period, each stage of the main branch is connected in parallel to a stage of the secondary branch, such that the balancing solution lacks flexibility in terms of implementation and adaptation to the actual needs specific to the different storage elements of the branches.

OBJECT OF THE INVENTION

The object of the present invention is to propose a strategy for managing a battery that overcomes the disadvantages discussed above.

A first object is in particular to be able to balance a battery non-dissipatively, i.e. by means of charge transfer.

A second object is to provide a simpler solution at a lower cost than the current solutions of the "non-dissipative balancing" type.

A third object is to provide a flexible solution enabling the transfer of energy between any elements of the battery, regardless of whether the battery is in use.

A fourth object is to provide a solution that provides a short balancing duration and that improves the adaptation to the actual needs of the storage elements considered separately.

We will recopy the claims here after acceptance by the applicant

BRIEF DESCRIPTION OF THE DRAWINGS

Further advantages and features will become clearer from the following description of specific embodiments of the invention given by way of non-limiting example and shown in the accompanying drawings, in which.

DESCRIPTION OF PREFERRED EMBODIMENT OF THE INVENTION

Figure 1:
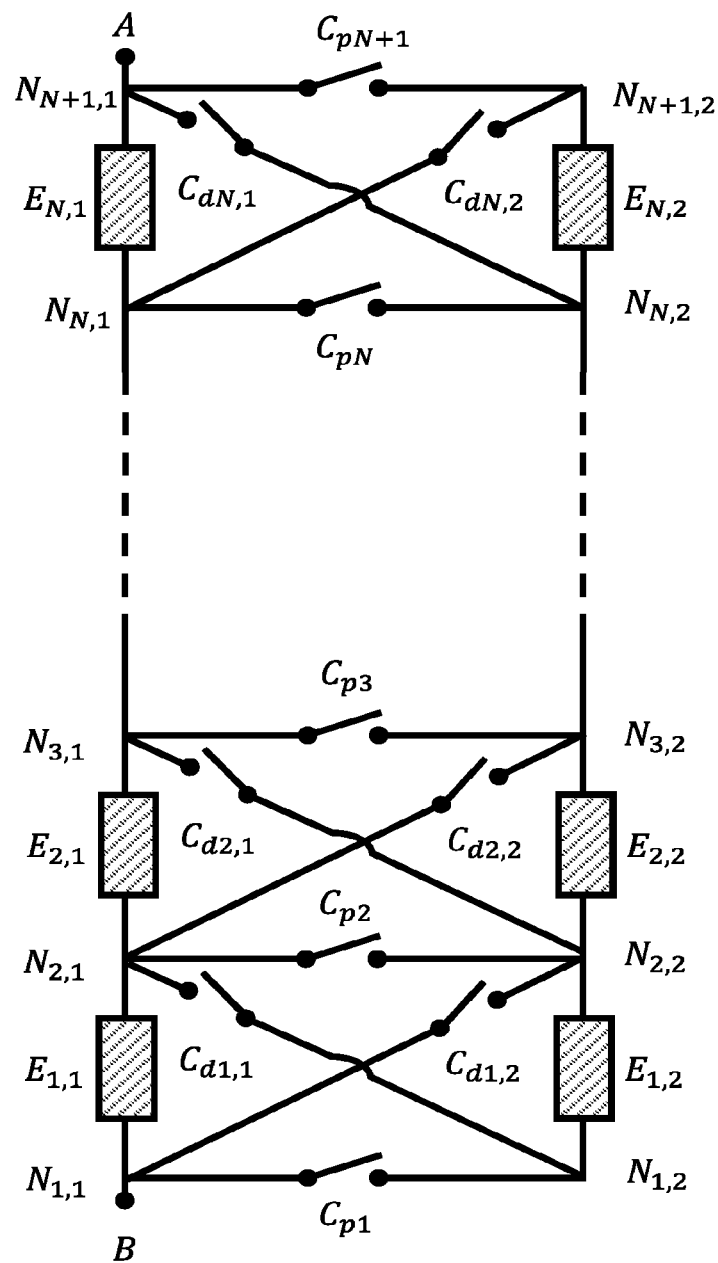
FIG. 1 shows the electrical structure of a first storage battery for which the management method according to the invention can be applied via an exemplary management device according to the invention.

FIG. 1 shows on the one hand the electrical structure of a storage battery for which the management method detailed below can be applied and on the other hand part of a management device which carries out this method.

The electrical energy storage battery thus comprises at least first and second branches electrically connected in parallel and each having N storage elements electrically connected in series to one another within the same branch.

More precisely, each branch comprises a plurality of storage elements $E_{i,j}$ (here, i varies between 1 and N because each branch comprises N storage elements connected in series, and j varies between 1 and 2 because the battery comprises two branches) electrically connected to one another in an assembly in series along each branch. It goes without saying that the number m of branches assembled in parallel can be different from 2.

From the terminal A to the terminal B of the battery, the storage elements $E_{i,j}$ are thus arranged along their respective branch in an ordered manner at positions having a given row i. An element $E_{i,j}$ is thus arranged at a row position i along the branch j. Two storage elements in the same row within the two branches form what is known as a "stage". The battery, in addition to the storage elements $E_{i,j}$, comprises the electrical structure assuring an assembly of this type of the elements to one another and of the branches to one another. This structure comprises in particular direct electrical connections connecting, in pairs, two adjacent storage elements in the same branch and also connecting the connections of the branches to one another.

The no-load voltages of the storage elements $E_{i,j}$ are quite low, in the order of a few volts. Thus, in order to reach the nominal operating voltage of an electric circuit powered by the battery, it is necessary to connect in series a certain number of electrochemical storage elements, defining the number N. Another design criterion of the battery corresponds to the autonomy that can be obtained therewith, this being defined by the capacity of the storage elements. The bridging of two storage elements of the same type makes it possible for example to double the storage capacity. Thus, the number m of branches makes it possible to define the overall capacity of the battery.

Each storage element $E_{i,j}$ of the battery is formed in the following description by a supercapacitor, or an electrochemical unit cell, or a unit having at least one pair of cells of this type electrically connected in parallel, or a module comprising at least two units of this type electrically connected to one another in series, or an assembly comprising at least two modules of this type electrically connected to one another in series or in parallel.

Each storage element $E_{i,j}$ is unique in terms of its design. The process for manufacturing the storage elements does not make it possible to obtain completely identical elements. The capacity and the internal resistance in particular can differ. In addition, ageing phenomena of these storage elements lead to losses of capacity and to increases of internal resistance, which tend to emphasize these differences of features. Thus, two storage elements in series through which the same current is then passed may see their state of charge develop differently and must be balanced so as to allow optimal use of the battery. In order to respond to these problems posed in the case of the electrical structure of FIG. 1, the management device comprises software and/or hardware means which carry out a management method which will be described further below and of which the purpose is to balance the states of charge of all or some of the storage elements comprised by the battery, in a non-dissipative manner, after storage elements of which the voltages are to be balanced have been selected beforehand from said at least two branches.

In particular, the management device comprises, so as to be able to carry out the management method, a non-dissipative balancing device for balancing the electrical voltages at the terminals of the storage elements of the battery. This balancing device comprises:

- a number N+1 of switching elements of a first type $C_{pk}$ (with k varying from 1 to N+1) capable of electrically connecting, in parallel, two storage elements belonging respectively to the first and second branches at a same stage,
- a number 2N of switching elements of a second type capable of electrically connecting, in parallel, two storage elements belonging respectively to the first and second branches at adjacent stages.

More precisely, the balancing device comprises a first half N of switching elements of the second type, each referenced $C_{dk,1}$ (where k varies from 2 to N). Each switching element $C_{dk,1}$ is placed at an electrical connection connecting the positive (or, respectively, negative) terminal of a storage element of the first branch of a given stage to the positive (or, respectively, negative) terminal of the storage element of the second branch of the directly adjacent and lower stage. The balancing device comprises a second half N of switching elements of the second type, each referenced $C_{dk,2}$ (where k varies from 2 to N). Each switching element $C_{dk,2}$ is placed at an electrical connection connecting the positive (or, respectively, negative) terminal of a storage element of the first branch of a given stage to the positive (or, respectively, negative) terminal of the storage element of the second branch of the directly adjacent and upper stage.

Each switching element $C_{pk}$ is placed at an electrical connection connecting the positive (or, respectively, negative) terminal of a storage element of the first branch of a given stage to the positive (or, respectively, negative) terminal of the storage element of the second branch of the same stage.

From the above, the following references in FIG. 1 have the following meanings:

$E_{i,1}$ with i=1, 2, . . . , N denotes the storage elements of the first branch, referred to as the main branch, of the battery, $E_{i,2}$ with i=1, 2, . . . , N denotes the storage elements of the second branch, referred to as the secondary branch, of the battery, $N_{i,1}$ with i=1, 2, . . . , N+1 denotes the electric nodes of the architecture of the first branch, $N_{i,2}$ with i=1, 2, . . . , N+1 denotes the electric nodes of the architecture of the second branch, $C_{pk}$ with k=1, 2, . . . , N+1 denotes the switching elements of the first type making it possible to connect (or not) the electric nodes $N_{k,1}$ and $N_{k,2}$, $C_{dk,1}$ with k=1, 2, . . . , N denotes the switching elements making it possible to connect (or not) the electric nodes $N_{k+1,1}$ and $N_{k,2}$, $C_{dk,2}$ with k=1, 2, . . . , N denotes the switching elements making it possible to connect (or not) the electric nodes $N_{k,1}$ and $N_{k+1,2}$, A denotes the point of highest potential of the battery, B denotes the point of lowest potential of the battery.

The term "stage X" of the battery is used for the elements comprised between the nodes $N_{X,1}$, $N_{X,2}$, $N_{X+1,1}$, $N_{X+1,2}$. For example, the stage 1 denotes the elements comprised between the nodes $N_{1,1}$, $N_{1,2}$, $N_{2,1}$, $N_{2,2}$, i.e. the storage elements $E_{1,1}$ and $E_{1,2}$ as well as the switching elements $C_{p1}$, $C_{p1}$, $C_{d1,1}$, $C_{d1,2}$.

The possibilities offered by this architecture are:

the switching elements $C_{pk}$ make it possible to electrically connect the storage elements of a same stage to one another, in parallel, the connectors $C_{dk,1}$ and $C_{dk,2}$ make it possible to electrically connect the storage elements of adjacent stages to one another, in parallel.

The switching elements $C_{pk}$, $C_{dk,1}$ and $C_{dk,2}$ are advantageously insulated-gate field-effect transistors commonly known as "MOSFETs", which stands for "metal oxide semiconductor field effect transistors". This variant has the advantage of being voltage-controlled in order to control the current in the circuit. However, the switching elements can be of any other type, such as relays or the like, provided they can be controlled and put up a low resistance to the passage of the current once closed.

The method preferably comprises:

a step of providing the non-dissipative balancing device described above, a selection step consisting of choosing only a portion of the storage elements of the first branch corresponding to a number of stages less than the total number N of stages of the battery and of choosing only a portion of the storage elements of the second branch corresponding to a number of stages less than the total number N of stages of the battery, a step of control of the switching elements $C_{pk}$, $C_{dk,1}$ and $C_{dk,2}$ so as to electrically connect to one another, in parallel, the selected storage elements of the first branch and the selected storage elements of the second branch, in particular in an assembly directly in parallel.

The term "assembly directly in parallel" is intended to mean the fact that the terminals of two selected storage elements are directly connected in pairs, excluding an arrangement in series.

Figure 2:
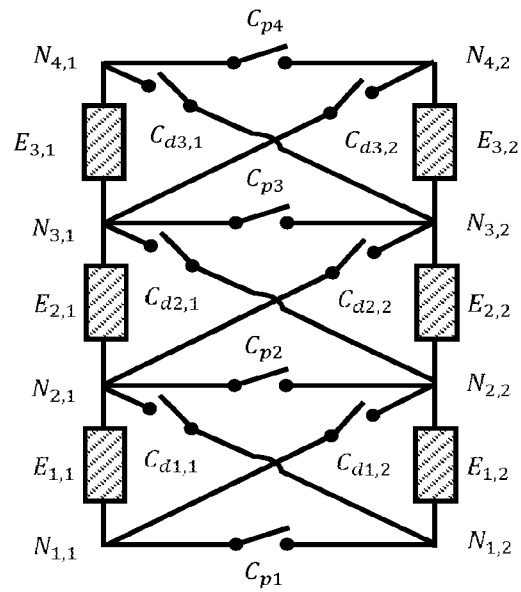
FIG. 2 is a variant of FIG. 1 having six storage elements.
Figure 3:
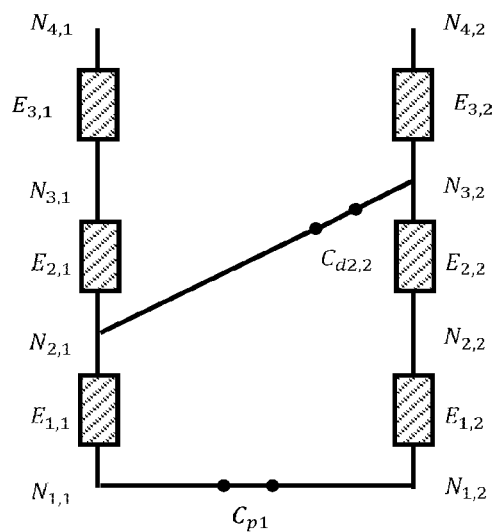
FIG. 3 shows the device of FIG. 2 after a first example of control of the switching elements selected beforehand.
Figure 4:
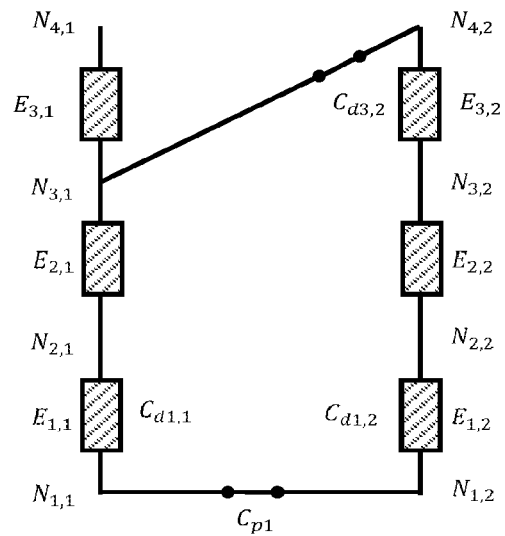
FIG. 4 shows the device of FIG. 2 after a second example of control of the switching elements selected beforehand.

The principle of balancing by a direct electrical bridging is presented with reference to FIGS. 3 and 4 in the case of application to the battery having three stages and to the associated management device that are shown in FIG. 2. Two branches are connected to one another in parallel and each comprise three storage elements assembled in series. The first branch comprises at least the storage elements $E_{1,1}$, $E_{2,1}$ and $E_{3,1}$ and the nodes $N_{1,1}$, $N_{2,1}$, $N_{3,1}$ and $N_{4,1}$. The second branch comprises at least the three storage elements $E_{1,2}$, $E_{2,2}$, $E_{3,2}$ and the nodes $N_{1,2}$, $N_{2,2}$, $N_{3,2}$ and $N_{4,2}$. The value of N is equal to 3. The balancing device comprises a number N+1, that is to say the number of 4, switching elements of the first type referenced $C_{p1}$, $C_{p2}$, $C_{p3}$ and $C_{p4}$ and able to electrically connect, in parallel, two storage elements belonging respectively to the first and second branches at a same stage; each switching element $C_{p1}$, $C_{p2}$, $C_{p3}$ and $C_{p4}$ is placed at an electrical connection connecting the positive (or, respectively, negative) terminal of a storage element of the first branch of a given stage to the positive (or, respectively, negative) terminal of the storage element of the second branch of the same stage, a first half of N switching elements of the second type, that is to say the number of 3 and referenced $C_{d1,1}$, $C_{d2,1}$, $C_{d3,1}$; each switching element $C_{d1,1}$, $C_{d2,1}$, $C_{d3,1}$ is placed at an electrical connection connecting the positive (or, respectively, negative) terminal of a storage element of the first branch of a given stage to the positive (or, respectively, negative) terminal of the storage element of the second branch of the directly adjacent and lower stage, a second half of N switching elements of the second type, that is to say the number of 3 and referenced $C_{d1,2}$, $C_{d2,2}$, $C_{d3,2}$; each switching element $C_{d1,2}$, $C_{d2,2}$, $C_{d3,2}$ is placed at an electrical connection connecting the positive (or, respectively, negative) terminal of a storage element of the first branch of a given stage to the positive (or, respectively, negative) terminal of the storage element of the second branch of the directly adjacent and upper stage.

In FIG. 3 the storage element $E_{1,1}$ was selected beforehand from the three storage elements of the first branch, and the storage elements $E_{1,2}$ and $E_{2,2}$ were selected beforehand from the three storage elements of the second branch. Then, during the step of control of the switching elements of the first type $C_{p1}$, $C_{p2}$, $C_{p3}$ and $C_{p4}$ and of the switching elements of the second type $C_{d1,1}$, $C_{d2,1}$, $C_{d3,1}$ and $C_{d1,2}$, $C_{d2,2}$, $C_{d3,2}$, only the switching element of the first type $C_{p1}$ and the switching element of the second type $C_{d2,2}$ are controlled into their closed state, all the other switching elements remaining in their open state, so as to electrically connect to one another, in parallel, the selected storage element $E_{1,1}$ of the first branch and the selected storage elements $E_{1,2}$ and $E_{2,2}$ of the second branch, in particular in a direct assembly in parallel.

In FIG. 4 the storage elements $E_{1,1}$ and $E_{2,1}$ were selected beforehand from the three storage elements of the first branch, and the three storage elements $E_{1,2}$, $E_{2,2}$ and $E_{3,2}$ were selected beforehand from the three storage elements of the second branch. Then, during the step of control of the switching elements of the first type $C_{p1}$, $C_{p2}$, $C_{p3}$ and $C_{p4}$ and of the switching elements of the second type $C_{d1,1}$, $C_{d2,1}$, $C_{d3,1}$ and $C_{d1,2}$, only the switching element of the first type $C_{p1}$ and the switching element of the second type $C_{d3,2}$ are controlled into their closed state, all the other switching elements remaining in their open state, so as to electrically connect to one another, in parallel, the selected storage elements $E_{1,1}$ and $E_{2,1}$ of the first branch and the selected storage elements $E_{1,2}$, $E_{2,2}$ and $E_{3,2}$ of the second branch, in particular in a direct assembly in parallel.

Following the control step, the assembly in parallel to at least two storage elements each formed by an electrochemical cell unique in terms of its design is accompanied by an equality of electric voltage, which generates the circulation of an electric balancing current. Thus, the balancing current will progressively charge the least-charged cell, and as the state of charge of said cell rises, the balancing current will decrease progressively.

In order to carry out the management method, the management device comprises a control unit (not shown) generating actuation commands that individually control the switching elements of the first type $C_{pk}$, and of the second type $C_{dk,1}$ and $C_{dk,2}$, these commands being selected so as to connect storage elements (selected beforehand by the control unit on the basis of given criteria) belonging to different branches, so as to carry out the management method described in this document, in particular in an assembly in parallel making it possible to provide a step of balancing of the states of charge of the selected storage elements. The storage elements implemented by the balancing operation can therefore be selected from all the storage elements comprised by the battery, thanks to the arrangement of the plurality of connections between the branches and of the plurality of switching elements $C_{pk}$, $C_{dk,1}$ and $C_{dk,2}$.

During the control step, the switching elements of the first type $C_{pk}$, and of the second type $C_{dk,1}$ and $C_{dk,2}$, or just some of the switching elements of the first type $C_{pk}$ and just some of the switching elements of the second type $C_{dk,1}$ and $C_{dk,2}$, preferably change state. In fact, in FIG. 3, only the switching element of the first type $C_{p1}$ and the switching element of the second type $C_{d2,2}$ change state from their open state to their closed state, and all the other switching elements remain in their open state. Similarly, in FIG. 4, only the switching element of the first type $C_{p1}$ and the switching element of the second type $C_{d3,2}$ change state from their open state to their closed state, and all the other switching elements remain in their open state.

With regard to the implementation of the management strategy when the battery is connected and during a phase of discharging of the battery, the selection step preferably comprises a step of determination of at least one storage element of the battery at the terminals of which the electric voltage is lower than the voltage of the other storage elements by a predetermined threshold, the storage elements selected in the selection step including said at least one storage element determined in the determination step. Depending on the chemical nature of the storage element and the strength of the current, this predetermined threshold can vary. However, it is approximately 10 mV, for example.

By contrast, with regard to the implementation of the management strategy when the battery is connected and during a phase of charging of the battery, the selection step preferably comprises a step of identification of at least one storage element of the battery at the terminals of which the electric voltage is greater than the voltage of the other storage elements by a predetermined threshold, the storage elements selected in the selection step including said at least one storage element identified in the identification step. Depending on the chemical nature of the storage element and the strength of the current, this predetermined threshold can vary. However, it is approximately 10 mV, for example.

It is therefore preferable to prioritize the recharging of the storage elements having the lowest voltages during the discharging of the battery and to prioritize the discharging of the storage elements having the highest voltages during the charging of the battery. The selection of the storage elements during the selection step takes into account these priorities.

The number of stages selected during the selection step and the choice of stages selected during the selection step from the first branch, and the number of stages selected during the selection step and the choice of stages selected during the selection step from the second branch are preferably chosen on the basis of, that is to say according to, selection criteria taking into account:

a sought balancing dynamic of the electric voltages at the terminals of the storage elements $E_{i,j}$ electrically connected in parallel following the control step, and/or a maximum value of the electric current strength circulating in said storage elements, in particular corresponding to said electric balancing current.

In particular, this can be implemented such that, during the selection step, the number of storage elements $E_{i,j}$ selected from the first branch and the number of storage elements $E_{i,j}$ selected from the second branch are different, so that the control step electrically bridges a different number of stages from the first branch and from the second branch. For example in FIG. 3 only the storage element of stage 1 of the first branch is selected in the selection step, whereas the two storage elements of stages 1 and 2 of the second branch are selected in the selection step, so that the control step electrically bridges stage 1 of the first branch with the two stages 1 and 2 of the second branch. For example in FIG. 4 only the two storage elements of stages 1 and 2 of the first branch are selected in the selection step, whereas the three storage elements of stages 1, 2 and 3 of the second branch are selected in the selection step, so that the control step electrically bridges the two stages 1 and 2 of the first branch with the three stages 1, 2 and 3 of the second branch. However, these provisions are neither exclusive nor limiting, and it is possible, in some conditions, for the control step to electrically bridge an equal number of stages from the first branch and from the second branch.

The selection step preferably comprises:

a step of identification, from the branch not including said at least one storage element determined in the determination step, of a number of storage elements greater than the number of storage elements determined in the determination step and having states of charge greater than that of said at least one storage element determined in the determination step, then a step of estimation of the electric balancing current circulating in said at least one storage element determined in the determination step after implementation of the step of control of the switching elements.

The selection step preferably comprises a step of estimation of the period of time necessary for the electrical recharging of said at least one storage element determined in the determination step after implementation of the step of control of the switching elements.

The selection step can in particular comprise a step of estimation of the difference in potential necessary for the electrical recharging of said at least one storage element determined in the determination step, in particular on the basis of the knowledge of the resistances of the components of the balancing device. The number and the stages of the storage elements selected in the selection step from the branch not containing said at least one storage element determined in the determination step are then preferably selected on the basis of said difference in potential and in a manner making it possible to generate the electric balancing current after implementation of the step of control of the switching elements.

In fact, the key point that makes it possible to dimension the electric balancing currents is the equivalent resistance of the meshes formed during the closure of the switching elements assuring the bridging of the storage elements following the control step. A careful choice of the components and in particular of the switching elements makes it possible to obtain the desired equivalent resistance and consequently the desired maximum electric balancing current. The dimensioning of the components and of the power strips is therefore to be implemented in accordance with this maximum electric balancing current.

This operational variant can be particularly beneficial in the case in which a single storage element has a fault. This faulty storage element requires a significant electric balancing current in order to be recharged so as not to constitute a limiting object during discharging of the battery.

These principles will be described in detail with application to the example of FIG. 3:

In a first step, the faulty storage element (which in this example is the storage element $E_{1,1}$) of the first branch is identified either on the basis of a voltage measurement that is much lower than that of the other storage elements, or on the basis of an estimation of the state of charge or reduced capacity of said storage element.

Then, in a second step, the control unit identifies whether the situation is suitable for the bridging of two storage elements (which in this example are the storage elements $E_{1,2}$ and $E_{2,2}$) of the second branch to a single element $E_{1,1}$ of the first branch.

If the storage elements $E_{2,2}$ and $E_{1,2}$ have states of charge greater than that of the storage element $E_{1,1}$, it is then possible to provide the bridging of the two elements of the second branch to the storage element $E_{1,1}$ of the first branch. On the basis of the states of charge of the storage elements of the battery and the limit voltages for use of the storage elements, an electric current and a necessary period of recharging are estimated.

Then, on the basis of the knowledge of the resistances of the components, the control unit estimates the difference in potential necessary for the recharging of the faulty storage element $E_{1,1}$. This difference in potential thus provides information relating to the number of stages to be used in order to generate the balancing current and which of the stages are most suitable.

Figure 5:
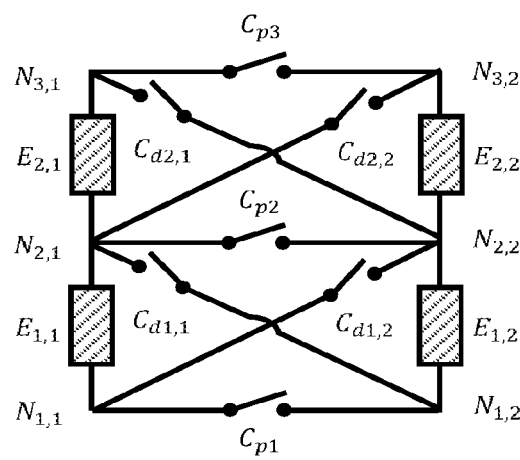
FIG. 5 is a variant of FIG. 1 having four storage elements.
Figure 6:
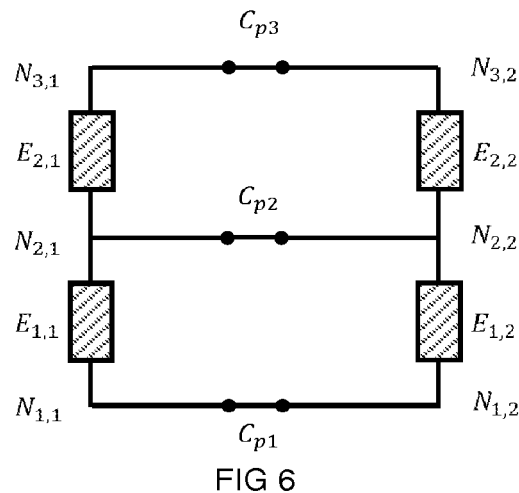
FIGS. 6 to 8 show the device of FIG. 5 during three different periods during which the switching elements are controlled differently.
Figure 7:
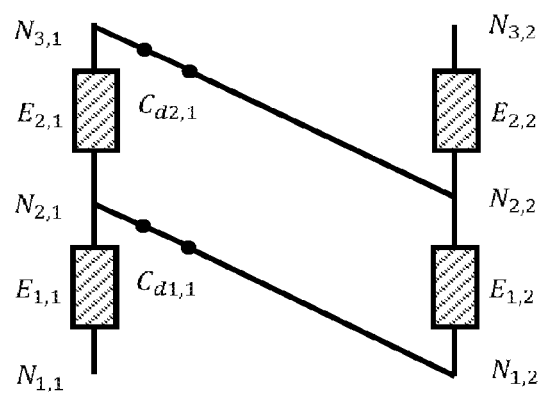
Figure 8:
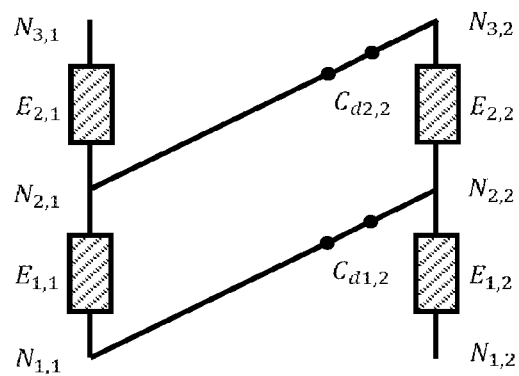

Preferably, and with reference to FIGS. 6 to 8 with application to the battery having two stages and to the associated management device that are shown in FIG. 5, the method can also comprise:
  a step of control solely of all the switching elements of the first type $C_{pk}$ during a first period so that the two storage elements belonging respectively to the first and second branches at a same stage are electrically connected to one another in parallel, this being the case for each stage of the battery,
  and/or a step of control solely of the first half of the switching elements of the second type $C_{dk,1}$ during a second period so that the storage elements of the first branch are each electrically connected in parallel to the storage element of the second branch at the adjacent and lower stage,
  and/or a step of control solely of the second half of the switching elements of the second type $C_{dk,2}$ during a third period so that the storage elements of the first branch are each electrically connected in parallel to the storage element of the second branch at the adjacent and upper stage.

Two branches are connected to one another in parallel and each comprise at least two storage elements assembled in series. The first branch comprises at least the storage elements $E_{1,1}$, $E_{2,1}$ and the nodes $N_{1,1}$, $N_{2,1}$, $N_{3,1}$. The second branch comprises at least the two storage elements $E_{1,2}$, $E_{2,2}$ and the nodes $N_{1,2}$, $N_{2,2}$, $N_{3,2}$. The value of N is equal to 2. The balancing device comprises
  a number N+1, that is to say the number of 3, switching elements of the first type referenced $C_{p1}$, $C_{p1}$ and $C_{p3}$ and able to electrically connect, in parallel, two storage elements belonging respectively to the first and second branches at a same stage; each switching element $C_{p1}$, $C_{p2}$, $C_{p3}$ is placed at an electrical connection connecting the positive (or, respectively, negative) terminal of a storage element of the first branch of a given stage to the positive (or, respectively, negative) terminal of the storage element of the second branch of the same stage,
  a first half of N switching elements of the second type, that is to say the number of 2 and referenced $C_{d1,1}$, $C_{d2,1}$, each switching element $C_{d1,1}$, $C_{d2,1}$ is placed at an electrical connection connecting the positive (or, respectively, negative) terminal of a storage element of the first branch of a given stage to the positive (or, respectively, negative) terminal of the storage element of the second branch of the directly adjacent and lower stage,
  a second half of N switching elements of the second type, that is to say the number of 2 and referenced $C_{d1,2}$, $C_{d2,2}$, each switching element $C_{d1,2}$, $C_{d2,2}$ is placed at an electrical connection connecting the positive (or, respectively, negative) terminal of a storage element of the first branch of a given stage to the positive (or, respectively, negative) terminal of the storage element of the second branch of the directly adjacent and upper stage.

In FIG. 6 solely all the switching elements of the first type $C_{p1}$, $C_{p2}$ and $C_{p3}$ are controlled (all the switching elements of the second type being maintained in their open state) during a first period so that the two storage elements belonging respectively to the first and second branches at a same stage are electrically connected to one another in parallel, this being the case for each stage of the battery. The joint closure of $C_{p1}$, $C_{p2}$ makes it possible, during the first period, for the two storage elements $E_{1,1}$ and $E_{1,2}$ belonging respectively to the first and second branches at the same stage 1 to be electrically connected to one another in parallel. The joint closure of $C_{p2}$, $C_{p3}$ makes it possible, during the first period, for the two storage elements $E_{2,1}$ and $E_{2,2}$ belonging respectively to the first and second branches at the same stage 2 to be electrically connected to one another in parallel. For reasons of clarity, the switching elements in the open state have not been shown. In this operating mode the electric current of the battery passes through both the first branch and the second branch. Transfers of energy occur within the stages between the first and second branches.

In FIG. 7 only the first half of switching elements of the second type $C_{d1,1}$, $C_{d2,1}$ is controlled during the second period so that the storage element $E_{2,1}$ of stage 2 of the first branch is electrically connected, in parallel, to the storage element $E_{1,2}$ of stage 1 of the second branch, i.e. at the adjacent and lower stage. This is the same for all other stages of the battery.

In FIG. 8 only the second half of switching elements of the second type $C_{d1,2}$, $C_{d2,2}$ is controlled during the third period so that the storage element $E_{1,1}$ of stage 1 of the first branch is electrically connected, in parallel, to the storage element $E_{2,2}$ of stage 2 of the second branch, i.e. at the adjacent and upper stage. This is the same for all the other stages of the battery. For reasons of clarity, the switching elements in the open state are not shown. In this operating mode the current of the battery passes through both the first branch and the second branch. Transfers of energy occur between stages 1 and 2.

In FIG. 5 all the switching elements of the first type and of the second type are in their open state. In this configuration the current of the battery passes through the first branch, but not the second branch. There is no transfer of energy between the stages. In this operating mode the current of the battery passes through both the first branch and the second branch. Transfers of energy occur between stages 1 and 2.

It is thus proposed in this document to use certain storage elements of the battery as a provisional energy store and to control the balancing device so as to transfer energy between the storage elements. Thus, the energy conversion chains are reduced to their simplest expression, and this avoids the addition of an intermediate electrical energy store component for the transfer of energy. The management method can be carried out in "connected" mode, i.e. when the battery is being charged and/or discharged. The means for controlling the switching elements $C_{pk}$, $C_{dk,1}$ and $C_{dk,2}$ are configured to control said switching elements so as to transfer energy from one stage to any other of the other stages, in particular by successive repetition of the controls of FIGS. 6 to 8.

Between two successive operating modes according to FIGS. 6 to 8, it may be beneficial to pass through an operating mode according to FIG. 5, in which all switching elements of the first type and of the second type are open in order to ensure that the switching elements are properly open before entering a new operating mode according to one of FIGS. 6 to 8.

Simulations have shown that the above management strategy makes it possible to return to the state of balance in terms of state of charge without discharge current of the battery, in the event of an imbalance of initial states of charge even in the case of a distribution of capacities of the storage elements.

Simulations have shown that the above management strategy also makes it possible to return to the state of balance in terms of state of charge even in the case in which a discharge current of the battery is circulating, in spite of distributions of capacities of the storage elements: the alternation of the operating modes according to FIGS. 5 to 8 makes it possible to return to the balanced state in terms of state of charge.

A particular, but not exclusive application lies in adapting a management device of this type onboard a motor vehicle in order to control the electrical energy storage battery supplying an electric power chain of the vehicle and/or auxiliary electric units installed onboard the vehicle. However, the invention can be applied to any battery system formed by at least two electrochemical cells in series, such as laptop batteries for example, or can also be applied to the balancing of supercapacitors.

The invention claimed is:

1. A method for managing an electrical energy storage battery including at least first and second branches electrically connected in parallel and each having N storage elements electrically connected in series, said method comprising:

when discharging the battery, determining at least one storage element of the N storage elements at terminals of the storage elements having a lower electric voltage than other storage elements of the N storage elements by a predetermined threshold;

identifying, from a branch of the at least first and second branches not including said at least one storage element determined in the determining, a number of storage elements greater than a number of said at least one storage element determined in the determining and having states of charge greater than that of said at least one storage element determined in the determining;

selecting only a portion of the storage elements of the first branch corresponding to a number of stages less than a total number of stages of the battery, and selecting only a portion of the storage elements of the second branch corresponding to a number of stages less than the total number of stages of the battery; and controlling switching elements of a non-dissipative balancing device so as to electrically connect to one another, in parallel, the selected storage elements of the first branch and the selected storage elements of the second branch, the non-dissipative balancing device being configured to balance electrical voltages at terminals of the storage elements and the balancing device including the switching elements, the switching elements including N+1 switching elements of a first type configured to electrically connect, in parallel, two storage elements belonging respectively to the first and second branches at a same stage, and 2N switching elements of a second type configured to electrically connect, in parallel, two storage elements belonging respectively to the first and second branches at adjacent stages, wherein the controlling includes changing state of at least one of the N+1 switching elements of the first type and at least one of the 2N switching elements of the second type from open to closed simultaneously.

2. The method as claimed in claim 1, wherein, during the controlling, only a portion of the switching elements of the first type and only a portion of the switching elements of the second type change state.

3. The method as claimed in claim 1, wherein the storage elements selected in the selecting including said at least one storage element determined in the determining.

4. The method as claimed in claim 3, further comprising, after identifying, estimating an electric balancing current circulating in said at least one storage element determined in the determining.

5. The method as claimed in claim 4, further comprising estimating a period of time necessary for electrical recharging of said at least one storage element determined in the determining.

6. The method as claimed in claim 4, further comprising estimating a difference in potential necessary for electrical recharging of said at least one storage element determined in the determining based on resistances of components of the balancing device, the number and the stages of the storage elements selected in the selecting from the branch not containing said at least one storage element determined in the determining are selected based on said difference in potential and in a manner making it possible to generate said electric balancing current.

7. The method as claimed in claim 1, wherein, during a phase of charging of the battery, the determining includes identifying at least one storage element of the N storage elements at the terminals having a greater electric voltage than other storage elements of the N storage elements by a predetermined threshold, the storage elements selected in the selecting including said at least one storage element having greater electric voltage than other storage elements of the N storage elements by the predetermined threshold.

8. The method as claimed in claim 1, wherein the number of stages and the selection of stages selected from both the first branch and the second branch are based on a selection criteria, the selection criteria includes a sought balancing dynamic of the electric voltages at the terminals of the storage elements electrically connected in parallel following the controlling and/or a maximum value of a strength of an electric current circulating in said storage elements.

9. The method as claimed in claim 1, wherein, during the selecting, the number of storage elements selected from the first branch and the number of storage elements selected from the second branch are different, so that the controlling electrically connects, in parallel, a different number of stages from the first branch and from the second branch.

10. A device for managing an electrical energy storage battery including first and second branches electrically connected in parallel and each having N storage elements electrically connected in series, said device comprising:
  a non-dissipative balancing device configured to balance electrical voltages at terminals of the storage elements of the battery, said balancing device including switching elements, the switching elements including N+1 switching elements of a first type configured to electrically connect, in parallel, two storage elements belonging respectively to the first and second branches at a same stage, and 2N switching elements of a second type configured to electrically connect, in parallel, two storage elements belonging respectively to the first and second branches at adjacent stages; and
  circuitry configured to individually control the switching elements of the first and second type, the circuitry being configured to
    determine at least one storage element of the battery at the terminals having lower electric voltage than other storage elements by a predetermined threshold,
    identify, from a branch of the first and second branches not including said at least one determined storage element, a number of storage elements greater than a number of the at least one determined storage element and having states of charge greater than that of said at least one determined storage element,
    select only a portion of the storage elements of the first branch corresponding to a lumber of stages less than a total number of stages of the battery, and only a portion of the storage elements of the second branch corresponding to a number of stages less than the total number of stages of the battery, and
    control the switching elements so as to electrically connect to one another, in parallel, the selected storage elements of the first branch and the selected storage elements of the second branch, wherein the circuitry is configured to change state of at least one of the N±1 switching elements of the first type and at least one of the 2N switching elements of the second type from open to closed simultaneously.

* * * * *